United States Patent
Iida et al.

(10) Patent No.: US 8,464,507 B2
(45) Date of Patent: Jun. 18, 2013

(54) WALK-BEHIND LAWN MOWER

(75) Inventors: Tetsuo Iida, Wako (JP); Shuhei Maruyama, Wako (JP); Nobuyuki Habuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/252,515

(22) Filed: Oct. 4, 2011

(65) Prior Publication Data

US 2012/0096826 A1    Apr. 26, 2012

(30) Foreign Application Priority Data

Oct. 26, 2010  (JP) ................................. 2010-240099

(51) Int. Cl.
*A01D 67/00* (2006.01)
*A01D 34/00* (2006.01)

(52) U.S. Cl.
USPC .......................................... 56/320.1; 56/16.7

(58) Field of Classification Search
USPC ................. 56/320.1, 320.2, 16.7, 16.9, 17.1, 56/17.4
See application file for complete search history.

(56) References Cited

U.S. PATENT DOCUMENTS

| | | | | |
|---|---|---|---|---|
| 3,959,954 A * | 6/1976 | Halsten | ........................... | 56/12.8 |
| 4,326,370 A * | 4/1982 | Thorud | ........................... | 56/202 |
| 4,951,449 A * | 8/1990 | Thorud | ............................... | 56/2 |
| 5,090,183 A * | 2/1992 | Thorud et al. | ........................ | 56/2 |
| 5,205,113 A * | 4/1993 | Fassauer | ......................... | 56/12.8 |
| 5,619,845 A * | 4/1997 | Bruener et al. | ................. | 320/137 |
| 5,638,667 A * | 6/1997 | Ellson et al. | ................... | 56/320.1 |
| 5,638,668 A * | 6/1997 | Kallevig et al. | .............. | 56/320.1 |
| 6,666,008 B2 * | 12/2003 | Iida et al. | ........................ | 56/11.9 |
| 6,705,068 B2 * | 3/2004 | Iida et al. | .......................... | 56/202 |
| 7,367,174 B2 * | 5/2008 | Grimwade | .................... | 56/320.2 |
| 8,132,396 B2 * | 3/2012 | Minami et al. | ................ | 56/320.2 |
| 2003/0037524 A1 * | 2/2003 | Iida et al. | ........................ | 56/11.9 |
| 2003/0037525 A1 * | 2/2003 | Iida et al. | ........................ | 56/11.9 |
| 2003/0066280 A1 * | 4/2003 | Iida et al. | ......................... | 56/167 |
| 2003/0182915 A1 * | 10/2003 | Kobayashi et al. | ............. | 56/202 |
| 2003/0217540 A1 * | 11/2003 | Osborne | ...................... | 56/320.1 |
| 2003/0221405 A1 * | 12/2003 | Hartley | ......................... | 56/320.1 |
| 2004/0237492 A1 * | 12/2004 | Samejima et al. | ........... | 56/320.1 |

(Continued)

FOREIGN PATENT DOCUMENTS

| | | |
|---|---|---|
| EP | 1637028 A1 | 3/2006 |
| GB | 1585875 A | 3/1981 |
| JP | 62-017824 U | 2/1987 |

OTHER PUBLICATIONS

European Search Report dated Jan. 23, 2012, issued in corresponding European Patent Application No. 11185574.8.

*Primary Examiner* — Thomas B Will
*Assistant Examiner* — Joan D Misa
(74) *Attorney, Agent, or Firm* — Westerman, Hattori, Daniels & Adrian, LLP

(57) ABSTRACT

A walk-behind lawn mower includes a cutter and a housing covering the cutter for allowing rotation of the cutter to cut grass. The housing includes a front wall portion covering a front part of the cutter and a portion other than the front wall portion. The front wall portion extends laterally of the housing. The front wall portion has a thickness more than twice a thickness of the portion other than the front wall portion. The front wall portion has a downwardly convex bottom surface, and serves as a handle for use in lifting up the lawn mower.

2 Claims, 8 Drawing Sheets

U.S. PATENT DOCUMENTS

2005/0076629 A1* 4/2005 Iida et al. .................. 56/320.2
2005/0284121 A1* 12/2005 Iida et al. .................. 56/202
2010/0307123 A1* 12/2010 Minami et al. ............... 56/320.2
2012/0023887 A1* 2/2012 Messina et al. ............. 56/320.1

* cited by examiner

WALK-BEHIND LAWN MOWER

FIELD OF THE INVENTION

The present invention relates to a lawn mower including a housing covering a cutter for allowing rotation of the cutter to cut grass.

BACKGROUND OF THE INVENTION

Walk-behind lawn mowers have housing covering cutters and serving as frames of the mowers. The housings are configured to have strength or rigidity sufficient to provide the frames.

The walk-behind lawn mowers are often lifted up for transportation or storage. In lifting up the lawn mower, front end portions of the housings may be used as handles. However, as discussed above, the housings are configured to have sufficient strength or rigidity to provide the frames, not to have the front end portions serve as handles useful for lifting up the mowers.

There is a walk-behind lawn mower including a handle separate from a housing for use in lifting up the lawn mower, as disclosed in JP-U-62-17824. However, the provision of such a handle separate from the housing results in the lawn mower having the increased number of components and requiring a more cost.

There is the need to a walk-behind lawn mower having a handle useful in lifting up the mower, without requiring additional cost and components.

SUMMARY OF THE INVENTION

According to one aspect of the present invention, there is provided a walk-behind lawn mower comprising: a cutter; a housing covering the cutter for allowing rotation of the cutter to cut grass; the housing including a front wall portion covering a front part of the cutter and a portion other than the front wall portion, the front wall portion extending laterally of the housing; the front wall portion having a thickness more than twice a thickness of the portion other than the front wall portion; the front wall portion having a downwardly convex bottom surface; and the front wall portion serving as a handle for use in lifting up the lawn mower.

The housing includes the front wall portion covering the front part of the cutter and the portion other than the front wall portion. The front wall portion is more than twice as thick as the portion other than the front wall portion. The front wall portion has the downwardly convex bottom surface. The bottom surface of downwardly convex shape has a larger area. The downward convex bottom surface of the front wall portion provides a load distributed over palms or fingers of user's hands when the user holds the front wall portion with the palms or fingers held in contact with the bottom surface of the front wall portion so as to lift up the walk-behind lawn mower. Thus, the distributed load applied to the entire palms or fingers can be small. The front wall portion serves as the handle useful in lifting up the lawn mower. The provision of the front wall portion serving as the handle eliminates the need to provide the lawn mower with an additional handle for use in lifting up the lawn mower. That is, the lawn mower provides the handle without requiring additional components used as a handle. The lawn mower with the front wall portion serving as the handle is lower in weight and requires a less cost than with the front wall portion separate from the handle.

Preferably, the front wall portion includes an inner wall disposed on a side of the cutter, an outer wall spaced outward from the inner wall, and ribs disposed between the inner wall and the outer wall. The inner wall has a downwardly convex bottom surface. The outer wall has a downwardly convex bottom surface.

The front wall portion, which has the inner and outer walls spaced from one another, is small in thickness. That is, the housing is molded in such a manner as to space the inner and outer walls from each other to provide the front wall portion free from sink marks.

The inner and outer walls have the downwardly convex bottom surfaces. The bottom surface of downwardly convex shape has a larger area. The downward convex bottom surface of the front wall portion provides a load distributed over palms or fingers of user's hands when the user holds the front wall portion with the palms or fingers held in contact with the bottom surface of the front wall portion so as to lift up the walk-behind lawn mower. Thus, the distributed load applied to the entire palms or fingers can be small.

Preferably, the ribs have downwardly convex bottom surfaces, and the bottom surface of the inner wall, the bottom surface of the outer wall and the bottom surfaces of the ribs are in flush with one another.

The downward convex bottom surface of the front wall portion provides a load distributed over palms or fingers of user's hands when the user holds the front wall portion with the palms or fingers held in contact with the bottom surface of the front wall portion so as to lift up the walk-behind lawn mower. Thus, the distributed load applied to the entire palms or fingers can be small.

Preferably, the outer wall of the front wall portion is offset outwardly from the portion other than the front wall portion, and the front wall portion has a curved outer surface extending from the portion other than the front wall portion to the outer wall of the front wall portion.

When rainwater flows downwardly along the portion other than the front wall portion, the curved outer surface of the front wall portion guides the rainwater to the outer wall to thereby prevent the rainwater from collecting between the outer wall and the portion other than the front wall portion.

Preferably, the walk-behind lawn mower further comprises reinforcing ribs disposed on an inner surface of the portion other than the front wall portion. The inner surface is located rearward of the front wall portion. The reinforcing ribs are disposed away from the front wall portion.

The reinforcing ribs are not contact with user's fingers when the user holds the front wall portion with the fingers held in contact with the bottom surface of the front wall portion. With the reinforcing ribs keeping off the front wall portion, the user can easily hold the front wall portion with his fingers.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
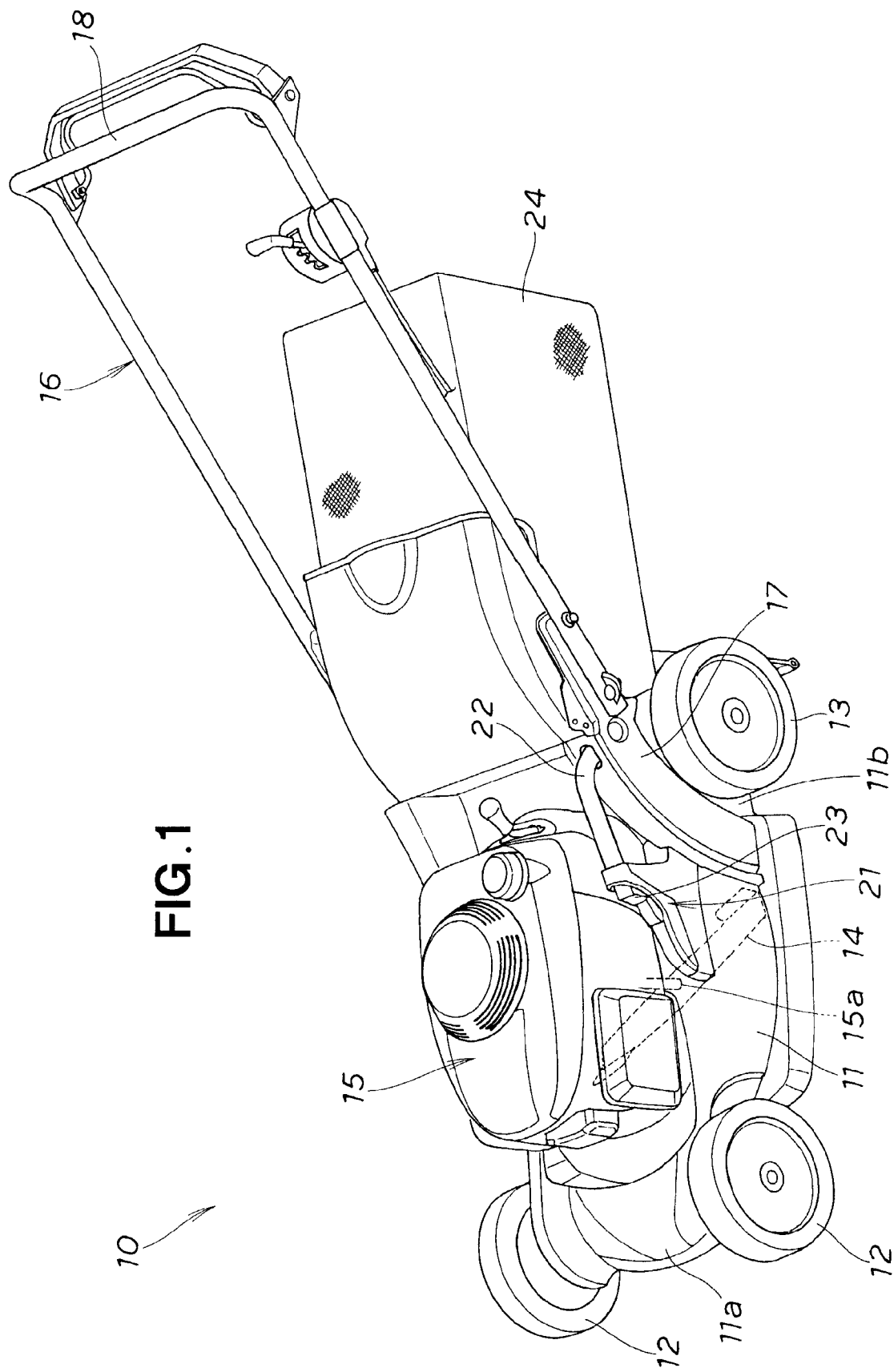
FIG. 1 is a perspective view of a lawn mower.

Referring to FIG. 1, a walk-behind lawn mower 10 is a self-propelled working machine for cutting grass. The lawn mower 10 includes a downwardly opening housing 11, left and right front wheels 12, 12 disposed at a front part 11a of the housing 11, left and right rear wheels 13, 13 (only one shown) disposed at a rear part 11b of the housing 11, a grass-cutting cutter 14 disposed in the middle of a space defined within the housing 11, an engine (drive source) 15 disposed atop the housing 11, and a handle 16 extending rearward from the rear part 11b of the housing 11.

The housing 11, which covers the cutter 14, is a molded member defining a part or entire frame of the lawn mower 10. Provided leftward of the housing 11 is a height adjustment mechanism 21 having a handle 22 and a control button 23 to be pushed by an operator with the handle 22 held by his hand for moving up and down the housing 11.

The engine 15 is bolted to the housing 11. The engine 15 has an output shaft 15a extending vertically downwardly into the housing 11. The output shaft 15a has a lower end attached to the cutter 14 for rotating the cutter 14 on the output shaft 15a when the engine 15 is driven. The engine 11 is driven to rotate the rear wheels 13, 13 forward or reversely through a continuously variable transmission (CVT), a transmission shaft and a gear train. The rear part 11b of the housing 11 is connected through stays 17, 17 (only one shown) to the handle 16. The handle 16 has a grip 18 at a top thereof.

As the engine 15 is driven to rotate the cutter 14 and the rear wheels 13, 13, an operator holds the grip 18 allowing the lawn mower 10 to travel forward cutting grass. The rotating cutter 14 cuts grass and produces a swirling air within the housing 11 to carry the cut grass into a container 24.

Figure 2:
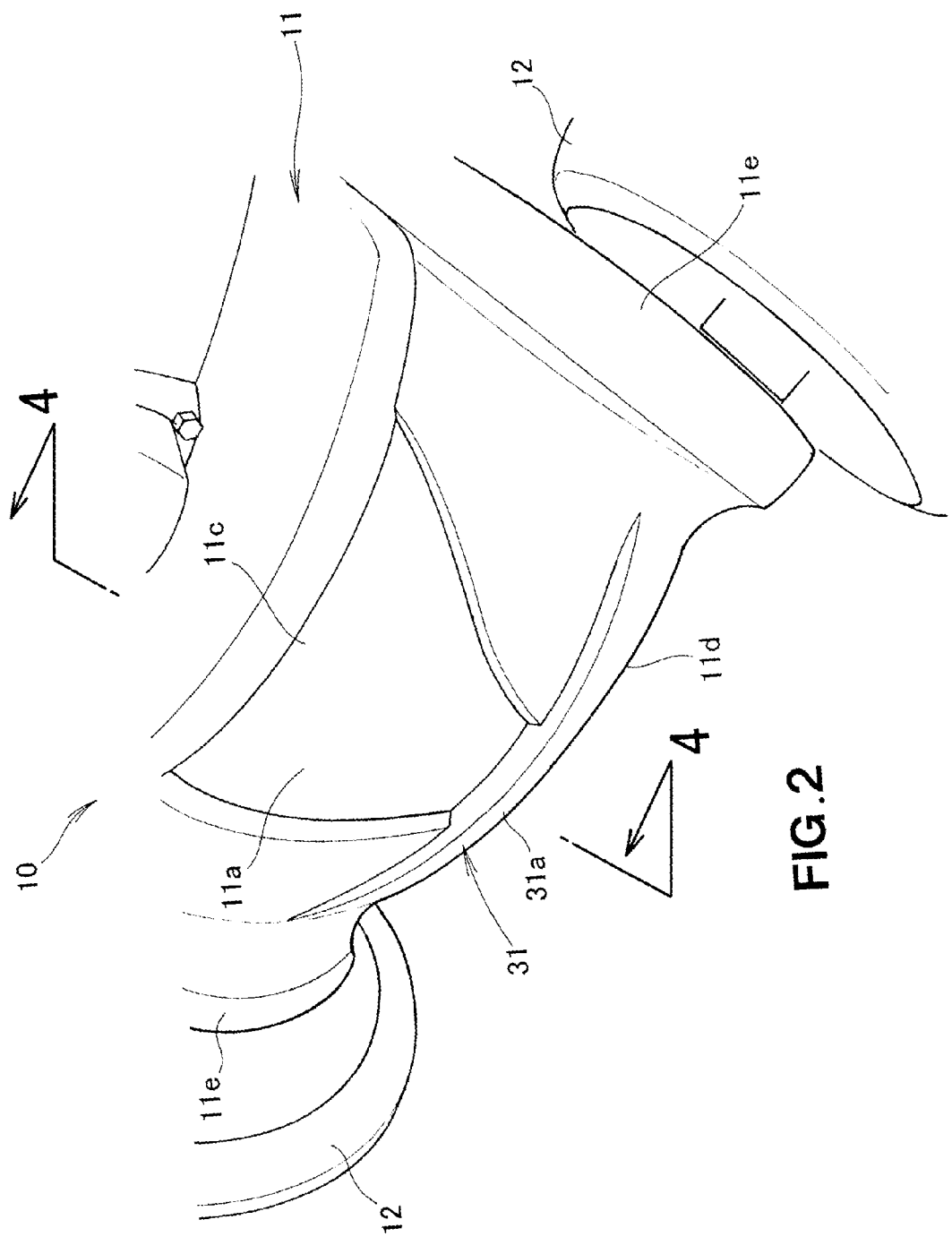
FIG. 2 is a perspective view of a front part of a housing of the lawn mower shown in FIG. 1.

As shown in FIG. 2, the housing 11 has an outward convex front part 11a extending from a top 11c of the front part 11a to a bottom 11d of the front part 11a. The front part 11a has left and right sides rotationally supporting the left front wheel 12 and the right front wheel 12, respectively.

Figure 3:
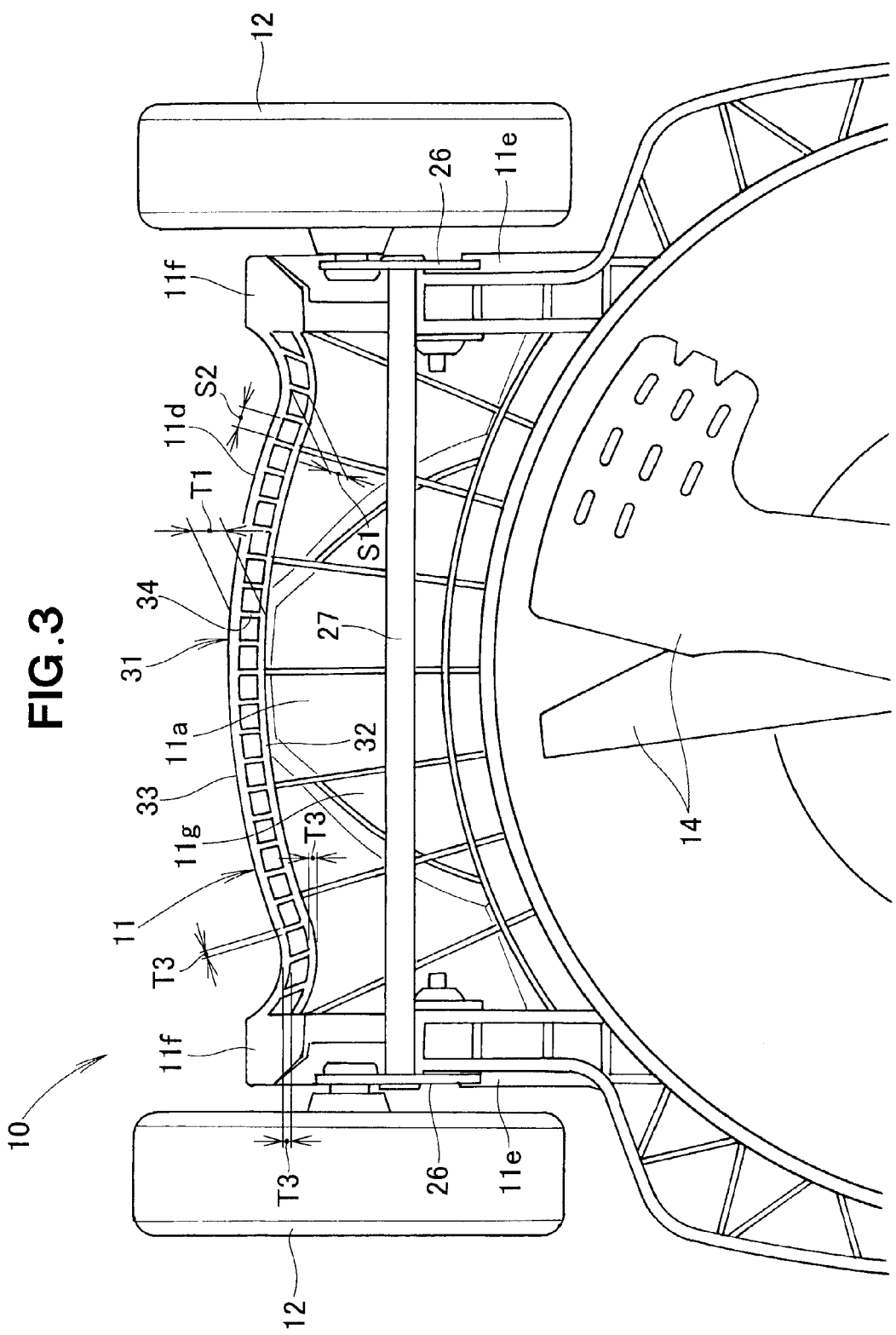
FIG. 3 is a bottom plan view of the front part of the housing of the lawn mower shown in FIG. 1.

Turning to FIG. 3, an axle 27 is attached through left and right brackets 26, 26 to left and right side wall portions 11e, 11e of the front part 11a of the housing 11. The left and right front wheels 12, 12 are rotationally attached to the right and left brackets 26, 26, respectively.

The housing 11 includes a front wall portion 31 interconnecting a front end 11f of the left side wall portion 11e and a front end 11f of the right side wall portion 11e. The front wall portion 31, which has an arc-shape when viewed in a bottom plan, includes its middle having a forward convex shape. The front wall portion 31, which extends laterally of the housing 11, is disposed forward of and covers a front part of the cutter 14. The front wall portion 31 has a thickness T1. The housing 11 has a portion 11g other than the front wall portion 31. The thickness T1 of the front wall portion 31 is more than twice a thickness T2 (FIG. 4) of the portion 11g other than the front wall portion 31.

Figure 4:
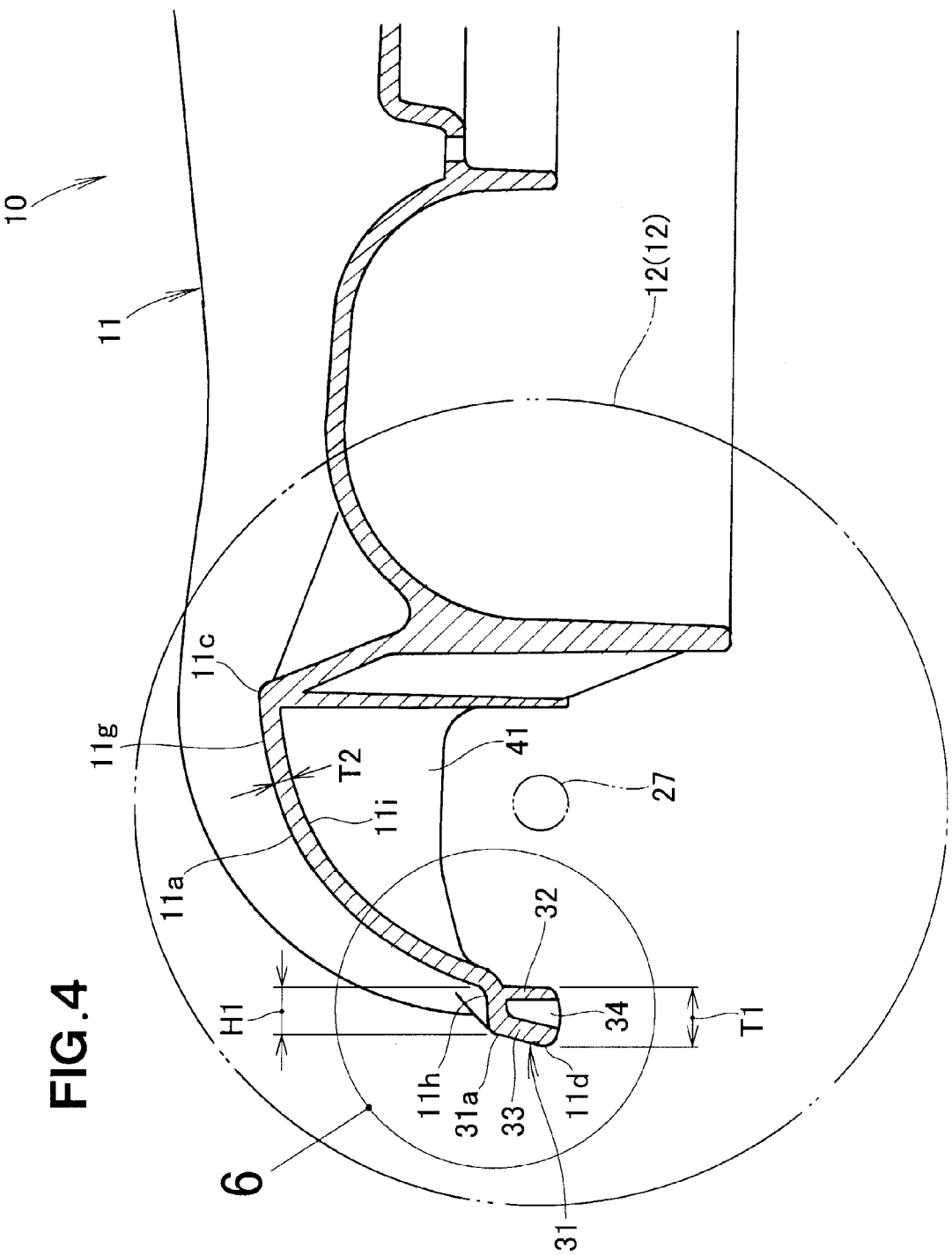
FIG. 4 is a cross-sectional view taken along line 4-4 of FIG. 2.

As shown in FIG. 4, the front wall portion 31 has an outer surface 31a offset outward (forward) from the portion 11g of the housing 11 by a distance H1. The front wall portion 31 has a smoothly curved outer surface 11h extending from the portion 11g of the housing 11 to the outer surface 31a of the front wall portion 31. When rainwater flows downwardly along the portion 11g other than the front wall portion 31, the curved outer surface 11h can guide the rainwater to the outer surface 31a so as to prevent the rainwater from collecting between the portion 11g and the outer surface 31a.

The front part 11a of the housing 11 includes a plurality of reinforcing ribs 41 disposed away from the front wall portion 31 and formed on an inner surface 11i located rearward of the front wall 31. The front part 11a of the housing 11 is reinforced by the ribs 41.

Figure 5:
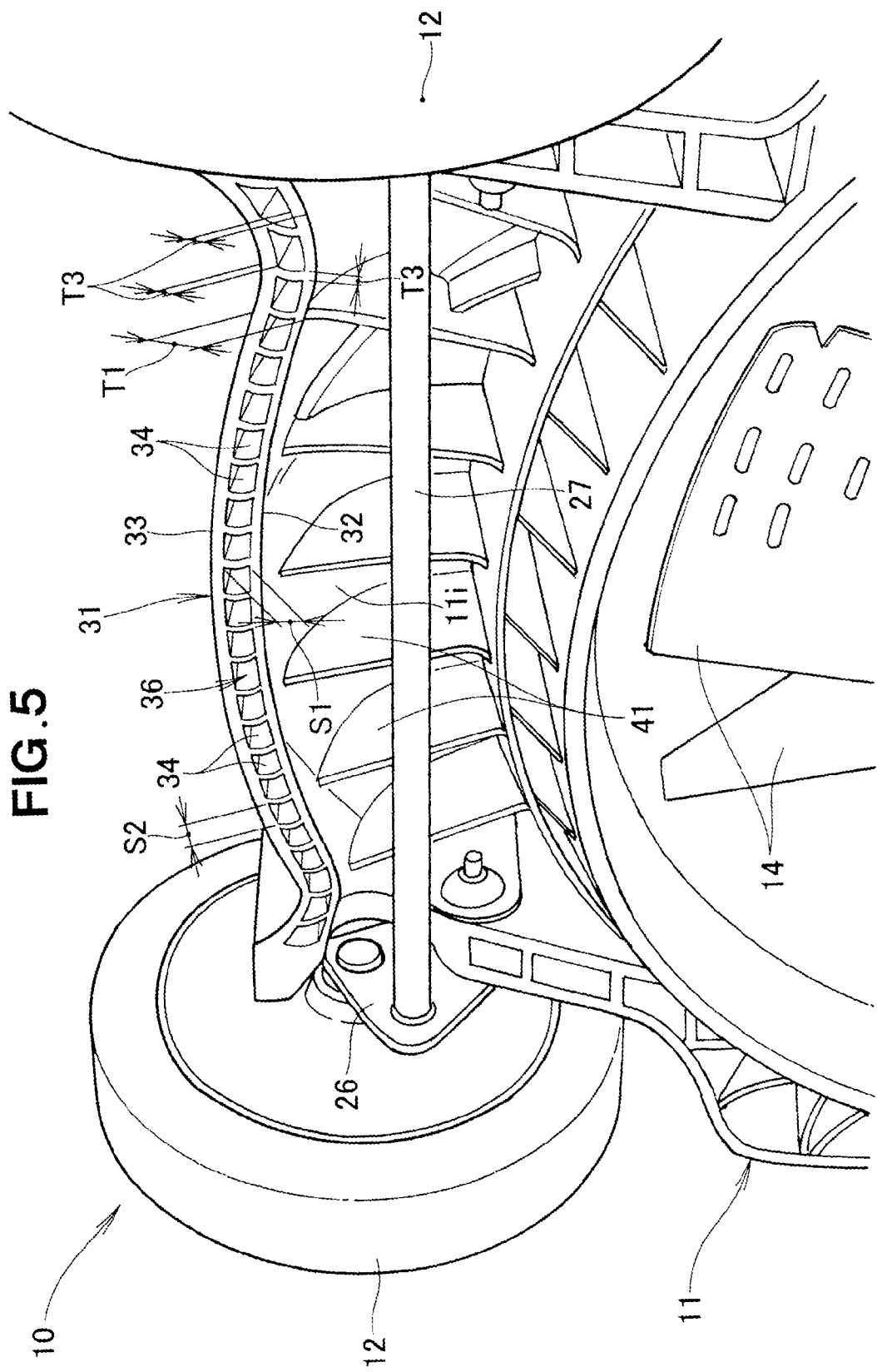
FIG. 5 is a view showing in perspective the housing front part shown in FIG. 3.

As shown in FIG. 5, the front wall portion 31 includes an inner wall 32 disposed on a side of the cutter 14, an outer wall 33 spaced outwardly from the inner wall 32 by a predetermined interval S1, and a plurality of ribs 34 disposed between the inner and outer walls 32, 33 and spaced from one another by a predetermined interval S2.

The inner wall 32, the outer wall 33 and each of the ribs 34 define a space 36. The inner wall 32 and the outer wall 33 have their small thicknesses T3, T3. The small thickness T3 of each of the walls 32, 33 results in the front wall portion 31 having overall thickness reduced by an amount corresponding to a width of the space 36. With the inner and outer walls 32, 33 and the ribs thus arranged, the front wall portion 31 is free from sink marks after the housing 11 is molded.

Figure 6:
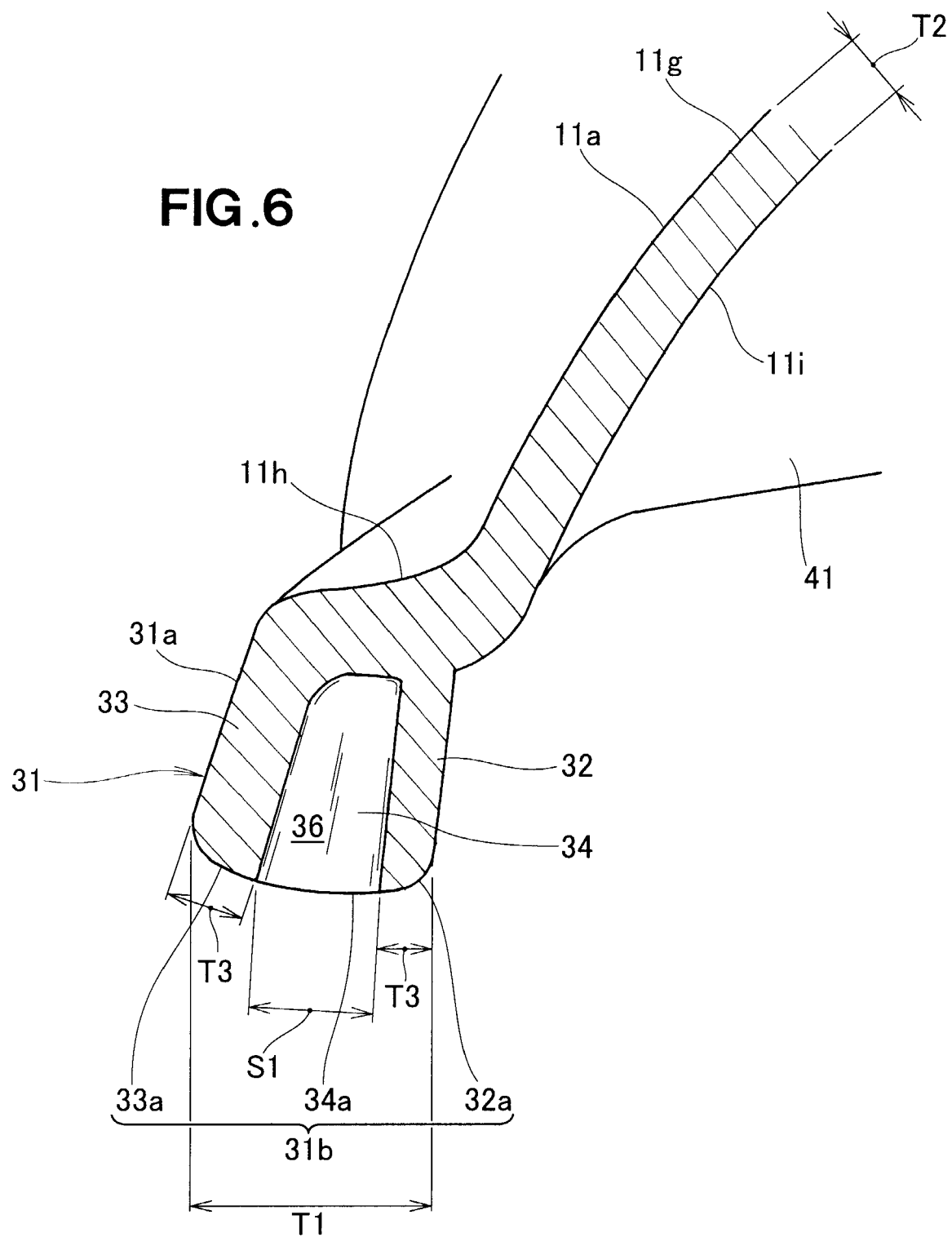
FIG. 6 is an enlarged view of a portion encircled by a circle 6 of FIG. 4.

As shown in FIG. 6, the inner and outer walls 32, 33 have bottom surfaces 32a, 33a, respectively. The ribs 34 have their bottom surfaces 34a. The bottom surface 32a, the bottom surface 33a, and the bottom surfaces 34a lie in the same plane, or are in flush with one another. The bottom surface 32a of the inner wall 32 is downwardly convexly curved. The bottom surface 33a of the outer wall 33 is downwardly convexly curved. The bottom surfaces 34a of the ribs 34 are downwardly convexly curved. The bottom surface 32a, the bottom surface 33a, and the bottom surfaces 34a define a bottom surface 31b of the front wall portion 31.

The thickness T1 of the front wall portion 31 is more than twice the thickness T2 of the portion 11g other than the front wall portion 31. The bottom surface 31b of the front wall portion 31, which has the thickness T1 more than twice the thickness T2 of the portion 11g, has a larger area. The bottom surface 31b of the front wall portion 31, which is defined by the downwardly convex bottom surfaces 32a, 33a, 34a, is complementary to inner surfaces of user's fingers so that the front wall portion 31 can contact the inner surfaces of the user's fingers throughout the bottom surface 31b. That is, the bottom surface 31b of the front wall portion 31 has its entire area sufficient to contact the inner surfaces of the user's fingers. The bottom surface 31b of the front wall portion 31 can provide a load uniformly distributed over to a wide area of the inner surfaces of the user's fingers when the user holds the front wall portion 31 with the inner surfaces of the user's fingers held in contact with the bottom surface 31b. The distributed load applied to the entire area of the inner surface of the user's fingers can be small. The front wall portion 31 can thus serve as a handle useful in lifting up the walk-behind lawn mower 10. The provision of the front wall portion 31 serving as the handle eliminates the need to provide the lawn mower 10 with a separate handle. The lawn mower 10 thus provides the handle without requiring an additional component used as the handle. The lawn mower 10 with the front wall portion serving as the handle is lower in weight and requires a less cost than with the front wall portion separate from the handle.

Turning back to FIG. 5, the reinforcing ribs 41 are formed on the inner surface 11i located rearward of the front wall portion 31. Since the reinforcing ribs 41 are located avoiding the front wall portion 31, the ribs 41 are not contact with the user's fingers held in contact with the bottom surface 31b of the front wall portion 31 when the user holds the front wall portion 31 to lift up the lawn mower 10.

Figure 7A:
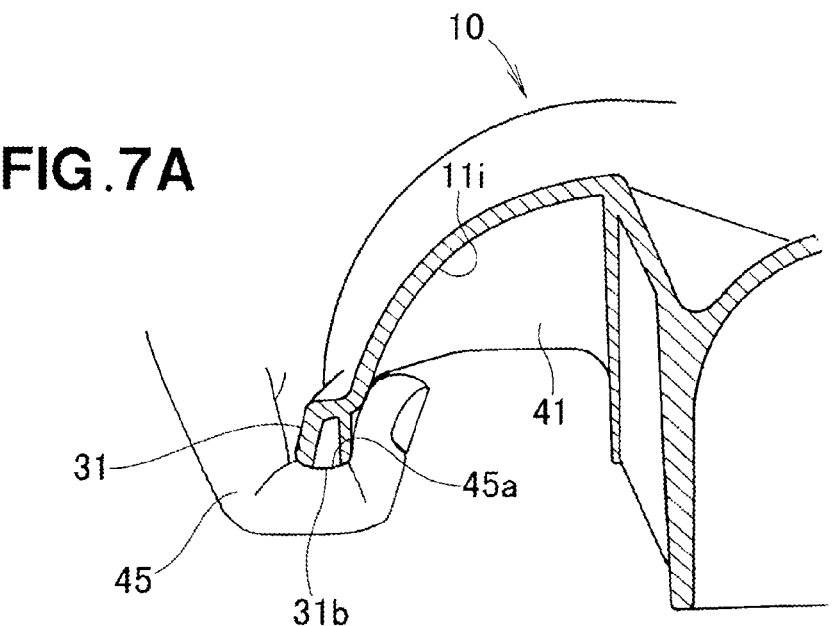
FIGS. 7A and 7B are views showing that a front wall of the housing is used as a handle.
Figure 7B:
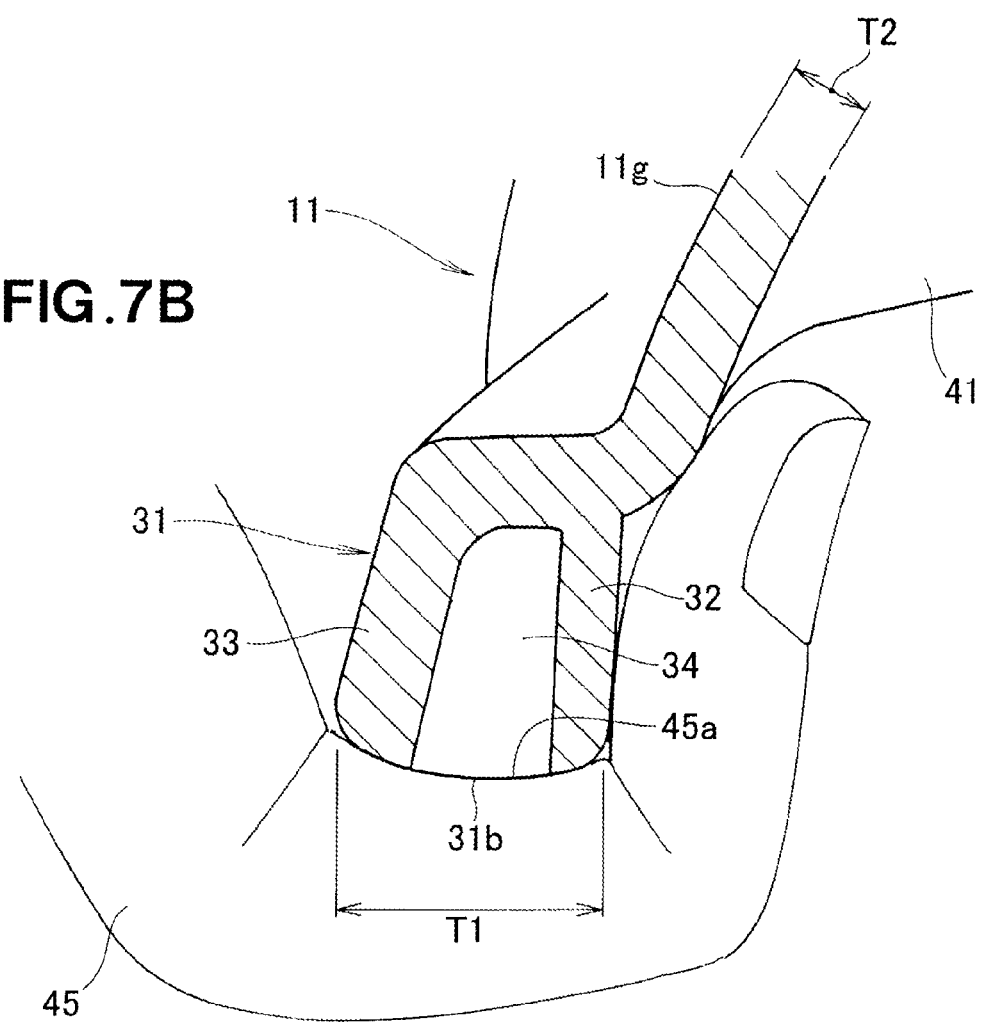
Figure 8:
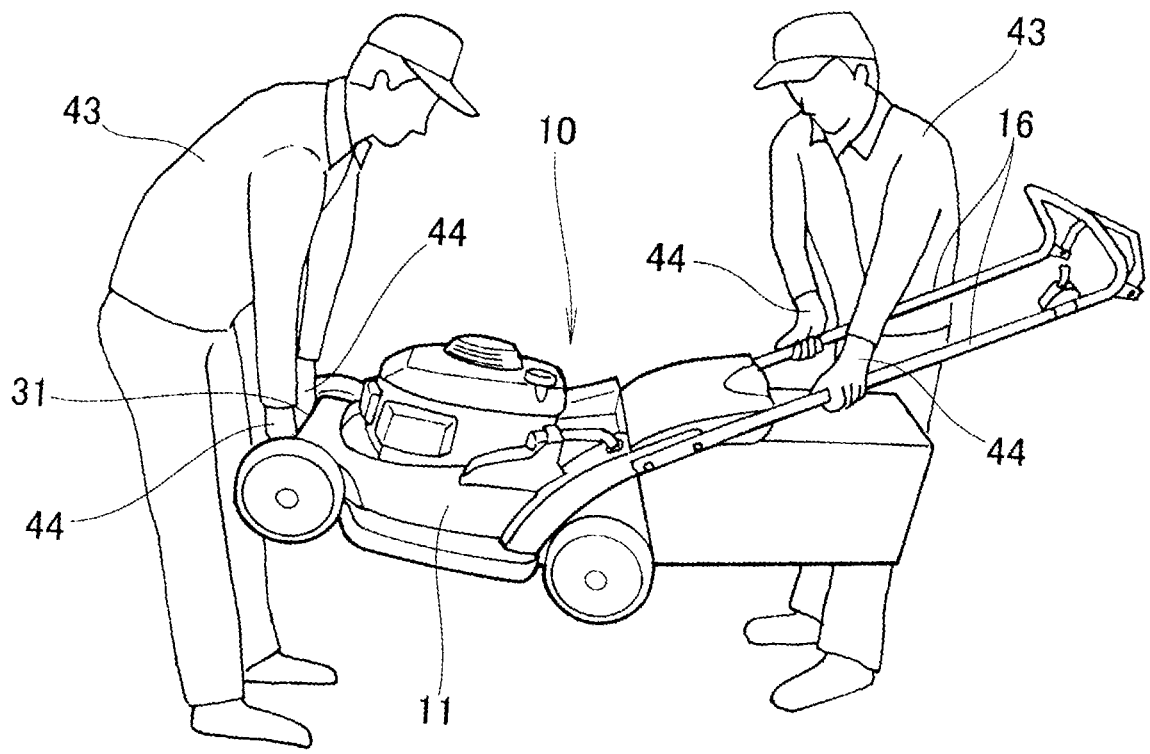
FIG. 8 is a view showing that the lawn mower is lifted up.

Reference is made to FIGS. 7A and 7B and FIG. 8 showing that the front wall portion 31 is used in lifting up the walk-behind lawn mower 10.

Referring to FIG. 7A, fingers 45 hold the front wall portion 31 to lift up the lawn mower 10. The reinforcing ribs 41 formed on the inner surface 11i located rearward of the front wall portion 31 are disposed away from the front wall portion 31, such that the reinforcing ribs 41 are not in contact with the fingers 45. With the reinforcing ribs 41 keeping off the fingers 45, the user can easily hold the front wall portion 31 with the fingers 45.

As shown in FIG. 7B, the thickness T1 of the front wall portion 31 is greater than the thickness T2 of the portion 11g other than the front wall portion 31. The bottom surface 31b of the front wall portion 31 is downwardly convexly curved. The bottom surface 31b has so large an area that the bottom surface 31b can entirely contact inner surfaces 45a of the fingers 45. The bottom surface 31b provides a load distributed over a wide area of the inner surfaces 45a of the fingers 45 as the fingers 45 hold the front wall portion 31. The distributed load applied to the entire area of the inner surfaces 45a can be small. The front wall portion 31 can thus serve as a handle useful in lifting up the walk-behind lawn mower 10.

As shown in FIG. 8, one of two people 43, 43 lifts up the lawn mower 10 holding the front wall portion 31 with their fingers 45 of both hands 44 while the other person lifts up the lawn mower 10 holding the handles 16, 16 with his both hands 44. The people 43, 43, who have lifted up the lawn mower 10 holding the front wall portion 31 and the handles 16, 16, can carry or store the lawn mower 10 into a desired place.

It will be understood that many changes or modifications can be made to the walk-behind lawn mower 10 in the illustrated embodiment. For example, the bottom surfaces 34a of the ribs 34 may extend downwardly to a level higher than the level of the inner and outer walls 32, 33 so that the bottom surfaces 34a and the bottom surfaces 32a, 33a of the inner and outer walls 32, 33 define a recess. The inner and outer walls 32, 33 may be thickened or configured to have a sufficient strength without the ribs 34 being disposed between the walls 32, 33. These changes or modifications may be made with the bottom surfaces 32a, 33a downwardly convexly curved to have their entire areas sufficient to contact inner surfaces of user's fingers. In such a case, the bottom surface 31b of the front wall portion 31 provides a load distributed over a wide area of the inner surfaces of the user's fingers.

It will be also understood that various changes or modifications may be made to the housing 11, the cutter 14, the front wall portion 31, the outer surface 31a, the inner wall 32, the outer wall 33 and the reinforcing ribs 41 without departing from the spirits of the present invention.

The present invention is applicable to a walk-behind lawn mower including a housing covering a cutter in such a manner as to allow the cutter to rotate cutting grass.

Obviously, various minor changes and modifications of the present invention are possible in light of the above teaching. It is therefore to be understood that within the scope of the appended claims the invention may be practiced otherwise than as specifically described.

What is claimed is:

1. A walk-behind lawn mower comprising:
   a cutter;
   a housing covering the cutter for allowing rotation of the cutter to cut grass;
   the housing including a front wall portion covering a front part of the cutter and a portion other than the front wall portion, the front wall portion extending laterally of the housing;
   the front wall portion having a thickness more than twice a thickness of the portion other than the front wall portion;
   the front wall portion having a smooth downwardly convexly curved bottom surface;
   the front wall portion serving as a handle for being held by user's fingers when the lawn mower is to be lifted up, and
   wherein the front wall portion includes,
      an inner wall disposed on a side of the cutter,
      an outer wall spaced outward from the inner wall,
      generally vertical ribs disposed between the inner wall and the outer wall,
      the inner wall having a downwardly convexly curved bottom surface,
      the outer wall having a downwardly convexly curved bottom surface,
      the ribs each having a downwardly convexly curved bottom surface, and
      the downwardly convexly curved bottom surface of the inner wall, the downwardly convexly curved bottom surface of the outer wall and the downwardly convexly curved bottom surfaces of the ribs being flush with one another and jointly forming the smooth downwardly convexly curved bottom surface of the front wall portion.

2. The walk-behind lawn mower of claim 1, further comprising reinforcing ribs disposed on an inner surface of the portion other than the front wall portion, the inner surface being located rearward of the front wall portion, the reinforcing ribs being disposed away from the front wall portion without interference with the user's fingers.

* * * * *